(12) United States Patent
Kazemi et al.

(10) Patent No.: US 10,629,080 B2
(45) Date of Patent: Apr. 21, 2020

(54) AUTONOMOUS VEHICLES FEATURING VEHICLE INTENTION SYSTEM

(71) Applicant: UATC, LLC, San Francisco, CA (US)

(72) Inventors: Moslem Kazemi, Allison Park, PA (US); Nicholas Fermin Andrey Sterner, Pittsburgh, PA (US); Eric Michael Perko, Pittsburgh, PA (US)

(73) Assignee: UATC LLC, San Francisco, CA (US)

( * ) Notice: Subject to any disclaimer, the term of this patent is extended or adjusted under 35 U.S.C. 154(b) by 147 days.

(21) Appl. No.: 15/700,466

(22) Filed: Sep. 11, 2017

(65) Prior Publication Data

US 2019/0066506 A1 Feb. 28, 2019

Related U.S. Application Data

(60) Provisional application No. 62/552,574, filed on Aug. 31, 2017.

(51) Int. Cl.
*G08G 1/16* (2006.01)
*B60W 50/00* (2006.01)
(Continued)

(52) U.S. Cl.
CPC ............ *G08G 1/161* (2013.01); *B60W 30/09* (2013.01); *B60W 30/0956* (2013.01);
(Continued)

(58) Field of Classification Search
CPC ............ G08G 1/161; G08G 1/096791; B60W 30/0956; B60W 40/04; B60W 50/14;
(Continued)

(56) References Cited

U.S. PATENT DOCUMENTS 9,632,502 B1 * 4/2017 Levinson .............. G01S 7/4972
2006/0217866 A1 9/2006 Moebus
(Continued)

FOREIGN PATENT DOCUMENTS

DE 102016205141 5/2017
WO WO2016152553 9/2016

OTHER PUBLICATIONS

Partial International Search Report for PCT/US2018/048161 dated Nov. 30, 2018, 15 pages.
(Continued)

*Primary Examiner* — Marthe Y Marc-Coleman
(74) *Attorney, Agent, or Firm* — Dority & Manning, PA

(57) ABSTRACT

The present disclosure provides autonomous vehicles that include a vehicle intention system that provides intention signals indicative of an intention of the autonomous vehicle. In particular, in one example, the vehicle intention system can obtain one or more operational messages from various systems or components of an autonomous vehicle that operate to control the autonomous vehicle. The operational messages can include operational data regarding the control or operation of the autonomous vehicle. The vehicle intention system can determine an intention of the autonomous vehicle based at least in part on the one or more operational messages. The vehicle intention system can output one or more intention signals that indicate the determined intention of the autonomous vehicle. For example, the vehicle intention system can publish intention messages that indicate the determined intention to one or more components or systems that consume the intention messages.

17 Claims, 5 Drawing Sheets

(51) Int. Cl.
*B60W 30/095* (2012.01)
*B60W 50/14* (2020.01)
*B60W 40/04* (2006.01)
*B60W 30/09* (2012.01)
*G06Q 50/30* (2012.01)
*G01C 21/26* (2006.01)
*G08G 1/0967* (2006.01)
*G05D 1/00* (2006.01)
*G06N 20/00* (2019.01)

(52) U.S. Cl.
CPC ............ *B60W 40/04* (2013.01); *B60W 50/00* (2013.01); *B60W 50/14* (2013.01); *G01C 21/26* (2013.01); *G05D 1/0088* (2013.01); *G06Q 50/30* (2013.01); *G08G 1/096791* (2013.01); *G08G 1/166* (2013.01); *B60W 2050/0088* (2013.01); *B60W 2750/40* (2013.01); *G06N 20/00* (2019.01)

(58) Field of Classification Search
CPC .. B60W 30/09; B60W 50/00; B60W 2750/40; B60W 2050/0088; G06Q 50/30; G01C 21/06; G05D 1/0088; G06N 20/00
USPC ........................................................ 701/23
See application file for complete search history.

(56) References Cited

U.S. PATENT DOCUMENTS

2013/0179023 A1 7/2013 Schmidt
2014/0379247 A1 12/2014 Ferguson et al.
2017/0097640 A1* 4/2017 Wang .................... G06N 7/005
2018/0284785 A1* 10/2018 Berntorp .............. G05D 1/0214

OTHER PUBLICATIONS

Huang et al., "Enabling Robots to Communicate their Objectives", arXiv:1702.03465v1, Feb. 11, 2017, 9 pages.
Meltzoff, "Understanding the Intentions of Others: Re-Enactment of Intended Acts of 18-Month-Old Children", Developmental Psychology, vol. 31, No. 5, 1995, pp. 838-850.
Mutlu et al., "Nonverbal Leakage in Robots: Communication of Intentions through Seemingly Unintentional Behavior", Proceedings of the 4th ACM/IEEE International Conference on Human Robot Interactions, La Jolla, California, Mar. 9-13, 2009, pp. 69-76.
International Search Report and Written Opinion for Application No. PCT/US2018/048161, dated Feb. 4, 2019, 20 pages.

\* cited by examiner

AUTONOMOUS VEHICLES FEATURING VEHICLE INTENTION SYSTEM

PRIORITY CLAIM

The present application claims priority to and the benefit of U.S. Provisional Patent Application No. 62/552,574, filed Aug. 31, 2017 and titled "Autonomous Vehicles Featuring Vehicle Intention System." U.S. Provisional Patent Application No. 62/552,574 is hereby incorporated by reference in its entirety.

FIELD

The present disclosure relates generally to autonomous vehicles. More particularly, the present disclosure relates to a vehicle intention system that provides intention signals indicative of an intention of an autonomous vehicle.

BACKGROUND

An autonomous vehicle is a vehicle that is capable of sensing its environment and navigating with little or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computing system of an autonomous vehicle. The computing system includes one or more processors and one or more non-transitory computer-readable media that store instructions that, when executed by the one or more processors, cause the one or more processors to implement a vehicle intention system that performs operations. The operations include obtaining one or more operational messages from one or more vehicle systems that contribute to operation of the autonomous vehicle. The one or more operational messages include operational data indicative of operation of the autonomous vehicle. The operations include determining an intention of the autonomous vehicle based at least in part on the one or more operational messages. The operations include outputting an intention signal that indicates the intention of the autonomous vehicle to one or more consumers.

Another example aspect of the present disclosure is directed to an autonomous vehicle. The autonomous vehicle includes one or more processors and one or more non-transitory computer-readable media that store instructions that, when executed by the one or more processors, cause the one or more processors to implement a vehicle intention system that performs operations. The operations include obtaining one or more operational messages from one or more producers. The one or more operational messages include operational data indicative of operation of the autonomous vehicle. The operations include determining an intention of the autonomous vehicle based at least in part on the one or more operational messages. The operations include outputting an intention signal that indicates the intention of the autonomous vehicle to one or more consumers.

Another example aspect of the present disclosure is directed to a computer-implemented method. The method includes subscribing, by a computing system that includes one or more computing devices, to receive operational messages from a plurality of message producers that produce operational messages that describe operation of an autonomous vehicle. At least some of the plurality of message producers operate independently of each other. The method includes receiving, by the computing system, a plurality of operational messages from the plurality of message producers. The method includes extracting, by the computing system, an intention of the autonomous vehicle from the plurality of operational messages received from the plurality of message producers. The method includes publishing, by the computing system, an intention message that indicates the extracted intention of the autonomous vehicle to one or more message consumers that have subscribed to receive intention messages that indicate the extracted intention.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
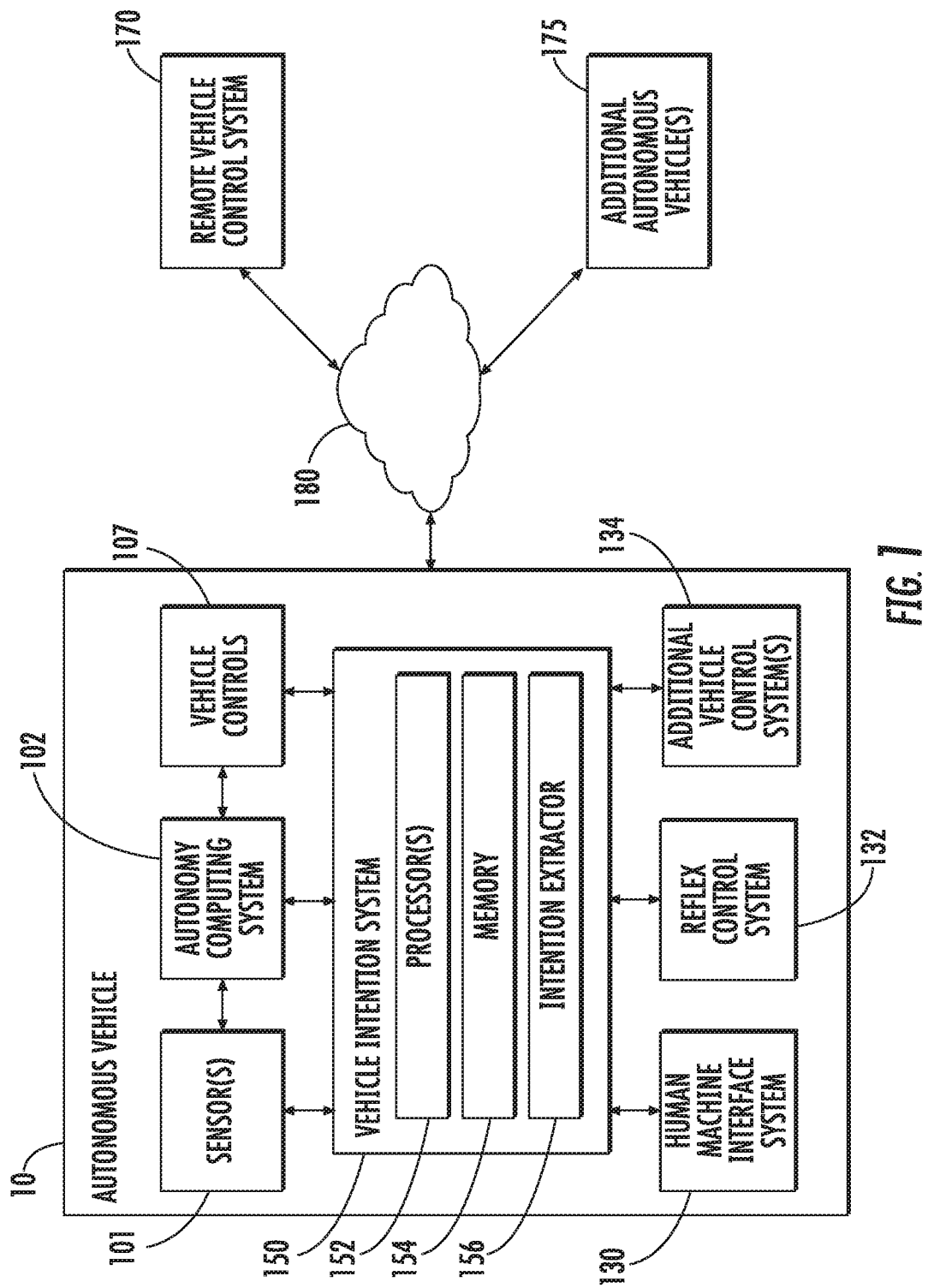
FIG. 1 depicts a block diagram of an example autonomous vehicle computing system according to example embodiments of the present disclosure.

Generally, the present disclosure is directed to a vehicle intention system that provides intention signals indicative of an intention of an autonomous vehicle. In particular, in one example, the vehicle intention system can obtain one or more operational messages from various systems or components of an autonomous vehicle that operate to control the autonomous vehicle. The operational messages can include operational data regarding the control or operation of the autonomous vehicle. The vehicle intention system can determine an intention of the autonomous vehicle based at least in part on the one or more operational messages. For example, the vehicle intention system can implement various algorithmic operations, rules-based systems, machine-learned models, and/or other data processing logic to extract the intention of the autonomous vehicle from the operational data. The vehicle intention system can output one or more intention signals that indicate the determined intention of the autonomous vehicle. For example, the vehicle intention system can publish intention messages that indicate the determined intention to one or more components or systems that consume the intention messages. As examples, the consumers of the intention messages can be components or systems that control the operation of the autonomous vehicle; components or systems that interact with human passengers of the autonomous vehicle; a remote computing system (e.g., a remote control system); and/or additional autonomous vehicles (e.g., located near the autonomous vehicle). The consumers of the intention messages can leverage knowledge of the intention of the autonomous vehicle to improve their respective operations. Thus, the vehicle intention system is able to extract a vehicle intention from multiple different and potentially disjoined sources of operational data. The vehicle intention system can serve as a single, definitive source of vehicle intention for various consumers (e.g., vehicle subsystems) which would otherwise be operating independently and/or without understanding of the intention of the autonomous vehicle as a whole.

More particularly, an autonomous vehicle can be a ground-based autonomous vehicle (e.g., car, truck, bus, trains, etc.), an air-based autonomous vehicle (e.g., airplane, drone, helicopter, or other aircraft), autonomous vehicles that operate through a system of tunnels (e.g., subway), or other types of vehicles (e.g., watercraft). The autonomous vehicle can include an autonomy computing system that assists in controlling the motion of autonomous vehicle. In some implementations, the autonomy computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system such as a Global Positioning System (GPS), and/or other sensors. The sensor data can include information that describes the location of objects within the surrounding environment of the autonomous vehicle.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for each object, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

According to an aspect of the present disclosure, the prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system.

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations.

As an example, in some implementations, the motion planning system operates to generate a new autonomous motion plan for the autonomous vehicle multiple times per second. Each new autonomous motion plan can describe motion of the autonomous vehicle over the next several seconds (e.g., 5 seconds). Thus, in some example implementations, the motion planning system continuously operates to revise or otherwise generate a short-term motion plan based on the currently available data.

The autonomy computing system described above is one example system that can contribute to control and operation of the autonomous vehicle. However, the autonomous vehicle can include or otherwise communicate with additional systems or components which also contribute to control and operation of the autonomous vehicle. As one example, in some implementations, in addition to the autonomy computing system described above, the autonomous vehicle can include a reflex control system that interrupts control of the motion of the autonomous vehicle by the autonomy computing system when sensor data indicates an imminent collision.

In some instances, these multiple systems may operate independently of each other or otherwise operate in a disjointed manner. For example, the ultimate impact of the operations and/or decisions of one system on the control and/or behavior of the autonomous vehicle may not be readily apparent or transparently communicated to other systems of the autonomous vehicle or related systems such as testing systems, development systems, vehicle behavior logging systems, remote control systems, fleet-level tracking and monitoring systems, etc.

In particular, the existence of multiple overlapping control systems can result in instances in which the ultimate intention of the autonomous vehicle, as guided by such multiple control systems, is neither readily apparent or available based solely on the operational data nor easily obtainable from an authoritative source. Even within the autonomy computing system described above certain subsystems may not be able to fully comprehend or extract the vehicle's intention based solely on operational data passed between such subsystems.

Thus, in the example framework described above and other vehicle frameworks, there is a significant need for identifying and providing access to the intention of the autonomous vehicle to various systems of the autonomous vehicle or related systems such as testing systems, development systems, vehicle behavior logging systems, remote control systems, fleet-level tracking and monitoring systems, etc. For example, the intention of the autonomous vehicle can generally correspond to what the autonomous vehicle intends to do over the next several seconds, for example, as a result of autonomous decision making via data processing.

In view of the above, according to an aspect of the present disclosure, the autonomous vehicle can further include a vehicle intention system. The vehicle intention system can receive operational messages from multiple independent and/or disjointed sources of operational data describing the operation of the vehicle. The vehicle intention system can determine an intention of the autonomous vehicle based at least in part on the one or more operational messages. For example, the vehicle intention system can include an intention extractor that implements various algorithmic operations, rules-based systems, machine-learned models, or other data processing logic to extract the intention of the autonomous vehicle from the operational data. The vehicle intention system can output one or more intention signals that indicate the determined intention of the autonomous vehicle. For example, the vehicle intention system can publish intention messages that indicate the determined intention to one or more components or systems that consume the intention messages.

Thus, the vehicle intention system can receive input from multiple sources (e.g., various producers of operational data which is indicative of vehicle intentions) and send output (e.g., vehicle intention messages) to various components (e.g., consumers of vehicle intentions), thereby serving as a single definitive source of vehicle intention information. In particular, in some implementations, the vehicle intention system serves as a layer to decouple the raw operational information indicative of the vehicle intentions and perform the process required to identify and extract the vehicle intentions from the raw operational data.

The vehicle intention system can provide a clean and well-defined interface between the producers of the operational data indicative of vehicle intentions and the consumers of vehicle intentions. For example, the interface can be provided in the form of subscription/publication messaging and/or an application programming interface (API).

More particularly, the vehicle intention system can receive or otherwise obtain one or more operational messages from various systems or components of an autonomous vehicle that operate to control the autonomous vehicle. These various systems or components that produce operational messages can be referred to as "producers" or "generators" of intention. Example producers include the autonomy computing system described above (e.g., the subsystems thereof such as the perception system, the prediction system, and, in particular, the motion planning system). Additional example producers of operational messages include other systems included in or associated with the autonomous vehicle such as, for example, a reflex control system, a remote control system, and/or other systems that contribute to control or operation of the autonomous vehicle. Thus, although most of the vehicle intentions are typically intended and decided by the motion planning system, there are other parts of an autonomous vehicle which may produce data indicative of vehicle intentions.

The operational messages received by the vehicle intention system can include operational data regarding the control or operation of the autonomous vehicle. In some instances, the operational data will be indicative of an intention of the autonomous vehicle but does not necessarily specify the intention itself. Stated differently, in some instances, the operational data may describe how operation or control of the vehicle is being performed to choose and/or achieve the intention, but does not specify the particular intention itself.

As an example, the perception system may output operational data that indicates the presence of a pedestrian within a roadway; the prediction system may output operational data that indicates the pedestrian is predicted to move slowly across the roadway; and, based on such operational data, the motion planning system may output its own operational data in the form of a motion plan in which the autonomous vehicle comes to a stop so as to avoid collision with the pedestrian as he crosses the roadway. Each of these forms of operational data may indicate in their own way that the vehicle's intention is to yield/stop to allow the pedestrian to cross the roadway. However, other systems may be unable to synthesize such operational data into a single understanding of such intention. For example, given the motion planning information alone, it may only be apparent that the vehicle intends to come to a stop, but not apparent that the intention to stop is due to a pedestrian crossing the roadway. This challenge of synthesizing across multiple sources of operational information to extract a singular vehicle intention is made significantly more difficult when, as described above, multiple different control systems exist which have overlapping control responsibilities and priorities.

As a solution to the above described challenge, the vehicle intention system can determine an intention of the autonomous vehicle based at least in part on the one or more operational messages. For example, the vehicle intention system can implement various algorithmic approaches, rules-based systems, machine-learned models, or other data processing logic to extract the intention of the autonomous vehicle from the operational data.

As one example, a rules-based system can apply hierarchical rules to discern between control operations of various control systems and determine which control system will actually control the vehicle's intention. As another example, the vehicle intention system can include a machine-learned intention model that receives the operational data as input and provides a vehicle intention as an output. For example, the machine-learned model can be a neural network (e.g., deep neural network), a decision tree-based model (e.g., random forest), or other form of machine-learned model. In one example, the machine-learned intention model can be trained in a supervised fashion on training data that includes sets of operational data (e.g., from multiple sources) labeled with a ground-truth intention.

Example intentions that can be determined by the vehicle intention system for an autonomous vehicle include: a yielding, stopping, or queueing for vehicle(s) ahead intention; a turning intention (e.g., make right turn); a continuing through traffic light intention; a stopping for traffic light or stop sign intention; a yielding, stopping, or queueing for bicycle intention; a yielding, stopping, or queueing for pedestrian intention; a lane change intention (e.g., change lane one lane to the right); a pulling to curb intention; a context-based speed limit intention or change in speed limit intention; an unprotected left turn intention; an unprotected right turn intention (e.g., stop then turn right); a merge intention; a cancellation intention (e.g., cancelling a previous intention to change lanes); and a nudge around intention.

As indicated by certain of the example intentions provided above, in some implementations, in addition to determining the base intention of the autonomous vehicle, the vehicle intention system can further identify a particular object (e.g., pedestrian, bicycle, vehicle, traffic signal (e.g., light or sign), etc.) that is a cause of the intention of the autonomous vehicle. As one example, in some implementations, the machine-learned intention model described above can be configured to identify the object that is the cause of the intention of the autonomous vehicle.

As another example, in some implementations, the vehicle intention system can identify the object that is the cause of the intention of the autonomous vehicle through performance of an iterative drop out method. In particular, the vehicle intention system can determine, based on one or more cost functions, a total cost associated with a surrounding environment of the autonomous vehicle that includes a plurality of objects. For example, the cost functions can be those used by the motion planning system to generate a motion plan. The vehicle intention system can iteratively remove a respective one of the plurality of objects to determine a respective reduction in the total cost as a result of removing such object from the surrounding environment. The object for which removal results in the largest reduction in the total cost can be selected as the particular object that is the cause of the intention of the autonomous vehicle. As one example, the total cost associated with the surrounding environment can be a sum of a cost field that describes a respective cost for autonomous vehicle travel through each location in the surrounding environment. For example, the cost field can be a three-dimensional curve and the sum of the cost field can equal the volume underneath the curve.

Furthermore, in some implementations, the vehicle intention system can further determine context information associated with the intention of the autonomous vehicle. As examples, such contextual information can include a class (e.g., type) of closest object for which the autonomous vehicle is planning to yield, stop, or queue; a distance to the closest object for which the autonomous vehicle is planning to yield, stop, or queue; a distance to a traffic light or stop sign at which the autonomous vehicle is planning to stop; or other contextual information.

The vehicle intention system can output one or more intention signals that indicate the determined intention of the autonomous vehicle. For example, the vehicle intention system can publish intention messages that indicate the determined intention to one or more components or systems that consume the intention messages.

As examples, the consumers of the intention messages can be components or systems that control the operation of the autonomous vehicle; components or systems that interact with human passengers of the autonomous vehicle; a remote computing system (e.g., a remote control system); and/or additional autonomous vehicles (e.g., located near the autonomous vehicle). The consumers of the intention messages can leverage knowledge of the intention of the autonomous vehicle to improve their respective operations.

In particular, vehicle intentions can play a major role in interaction with other actors (e.g., additional autonomous vehicles), other systems or components of the autonomous vehicle, passengers in the vehicle, and/or other consumers of intention information. As one example, the various subsystems of the autonomy computing system described above (e.g., a perception system, a prediction system, a motion planning system, or other subsystems) can significantly benefit from knowledge of the vehicle's intentions when the vehicle is operating in an autonomous mode.

For example, in response to an intention signal that identifies a particular object that is the cause of the intention of the autonomous vehicle, the autonomy computing system can adjust its operations to allocate additional processing resources to the particular object. For example, one or more subsystems of the autonomy computing system (e.g., perception and prediction systems) can prioritize processing of data associated with the particular object (e.g., by processing such data in an accelerated or advanced manner or by processing such data using systems/algorithms having relatively higher power and/or reduced latency).

As another example intention consumer, passengers in the vehicle can benefit from understanding the autonomous vehicle's intention. As such, one example system that can consume the intention signal or message is a human machine interface system that is included within the autonomous vehicle. The human machine interface system can indicates the intention of the autonomous vehicle to one or more humans physically located within the autonomous vehicle (e.g., via icons on a graphical user interface). As a result of the conveyed intention, the passenger can have a more comfortable ride and be more confident in the competency of the vehicle. For example, a passenger that has knowledge of the autonomous vehicle's intention to stop at a stop sign can better prepare for the corresponding changes in force, thereby enhancing passenger comfort. Likewise, if the autonomous vehicle's intention to stop for a pedestrian is conveyed to the passenger of the vehicle, the passenger can feel more comfortable and confident that the autonomous vehicle is understanding the surrounding environment and operating in a proper and safe manner.

As yet another example consumer, additional autonomous vehicles located near the autonomous vehicle can benefit from understanding the vehicle's intentions. For example, additional autonomous vehicles that have been informed of a first autonomous vehicle's intention to perform a lane change can adjust their spacing accordingly to enable the first autonomous vehicle to perform the lane change. As another example consumer, the autonomous vehicle can signal its intention to humans located external to the autonomous vehicle.

As another example consumer, a remote control system or a remote supervision system can consume the intention signals. For example, the intention of the autonomous vehicle can be displayed to a remote controller or a remote supervisor, which can, for example, be a human operator. In other examples, the remote control system can be associated with a central operations system and/or an entity associated with the autonomous vehicle such as, for example, a vehicle owner, vehicle manager, fleet operator, service provider, etc.

As yet another example, in some implementations, the intention signals output by the vehicle intention system over time can be logged or otherwise stored. These logged intention signals can be used for various purposes. As one example, the intention signals can be used as training data to train one or more machine-learned models. For example, the intention signals can be used to train a machine-learned intention model. As another example, the intention signals can be reviewed by a testing and development team when triaging vehicle failures or otherwise assessing and/or correcting/improving the performance of the autonomous vehicle after-the-fact.

In some implementations, the vehicle intention system can operate according to a publication/subscription model. For example, each of the one or more consumers can subscribe to a respective subset of particular intentions. The vehicle intention system can output a particular intention signal to only those consumers that have subscribed to the particular intention indicated by the intention signal. In such fashion, consumers can receive only those intention signals that indicate intentions to which they have subscribed and find useful. The consumers can adjust their subscriptions over time.

In addition, in some implementations, the following flow of operations can be performed to configure the vehicle intention system. The vehicle intention system can subscribe to various producer channels (e.g., motion planning system channels). This can be completely behind the scenes and abstracted away from the consumers. The consumer can then register its intention callbacks through the interface provided by the vehicle intention system API. At this point everything is set for the consumer to receive the intentions. Upon receiving the relevant messages from the producers, the vehicle intention system dispatches the corresponding intention callbacks registered by the consumer.

In some implementations, the vehicle intention system is a component within the autonomy computing system which runs independent of the rest of the autonomy computing system. In other implementations, the vehicle intention system can be a standalone system or otherwise not included within the autonomy computing system.

In some implementations, the vehicle intention system can communicate the vehicle intention with its consumers using a vehicle intention message structure. There can be a base vehicle intention message class structure which can be sub-classed to generate consumer-specific vehicle intention message structures.

As one example, in some implementations, the vehicle intention system can be implemented as a computing task. In this example design, the vehicle intention system can be implemented as a standalone computing task which runs in parallel and interacts with the other computing tasks through task channels and messages. The core of vehicle intention system (e.g., callbacks and algorithms) can be encapsulated as a library (e.g., a vehicle intention library) and can be instantiated as an object within the task.

As another example, in some implementations, the vehicle intention system can be implemented as a computing library. In this example design, the vehicle intention system can be implemented as a standalone library which provides an API for consumers to register their (intention) callbacks and a mechanism to dispatch the consumers' callbacks on availability of intentions. In some implementations of this design each consumer can be required to instantiate a copy of the library for its own use.

Thus, the vehicle intention system is able to extract a vehicle intention from multiple different and potentially disjointed sources of operational data. The vehicle intention system can serve as a single, definitive source of vehicle intention for various consumers (e.g., vehicle subsystems) which would otherwise be operating independently and/or without understanding of the intention of the autonomous vehicle as a whole.

The vehicle intention system of the present disclosure provides a number of technical effects and benefits. As one example, the vehicle intention system provides a standard and unified interface to communicate the vehicle intentions with the consumers. As another example, the vehicle intention system opens up the opportunity for aggregating raw information coming from multiple producers to better identify what the autonomous vehicle intends to do at each given time. The availability of a single authoritative source of vehicle intention can enable various systems of the autonomous vehicle to operate more efficiently or with improved performance, thereby improving the efficiency and performance of the autonomous vehicle as a whole.

As another example technical effect and benefit, the vehicle intention system fans in data from multiple producers (of intention data) and fans out one or more intentions to its consumers. Thus, the vehicle intention system decouples the interaction between the producers of vehicle intention data and its consumers; hence the consumers will be less affected by the changes on the providers' side. Likewise, intention processing and extraction can be improved through improvement of a single vehicle intention system rather than requiring each individual component or system to be updated or improved.

As yet another example technical effect and benefit, the vehicle intention system (including, for example, its interfaces and algorithms) can be tested, verified, and maintained independent of its providers and consumers. Likewise, the vehicle intention system can provide intention data which can be logged and analyzed (e.g., through debugging or failure triaging) to improve the performance of the autonomous vehicle, thereby leading to autonomous vehicle that provides improved safety, comfort, and efficiency.

With reference now to the Figures, example embodiments of the present disclosure will be discussed in further detail.

Example Devices and Systems

FIG. 1 depicts a block diagram of an example computing system of an autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft).

The autonomous vehicle 10 can include one or more sensors 101, an autonomy computing system 102, one or more vehicle controls 107, a vehicle intention system 150, a human machine interface system 130, a reflex control system 132, and/or one or more additional vehicle control systems 134. The above described components can be communicatively connected (e.g., over one or more communication lines of the autonomous vehicle 10 such as, for example, communication bus(es)). The autonomous vehicle 10 and/or certain components thereof can be communicatively coupled to a remote vehicle control or supervision system 170 and/or one or more additional autonomous vehicles 175 over one or more communications networks 180.

The vehicle intention system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data and instructions which are executed by the processor 152 to cause the vehicle intention system 150 to perform operations.

The vehicle intention system 150 can receive operational messages from multiple independent and/or disjointed sources of operational data describing the operation of the vehicle 10. For example, the vehicle intention system 150 can receive operational messages from the one or more sensors 101, the autonomy computing system 102, the one or more vehicle controls 107, the human machine interface system 130, the reflex control system 132, the one or more additional vehicle control systems 134, and/or the remote vehicle control or supervision system 170.

The vehicle intention system 150 can determine an intention of the autonomous vehicle 10 based at least in part on the one or more operational messages. For example, the vehicle intention system 150 can include an intention extractor 156 that implements various algorithmic operations, rules-based systems, machine-learned models, or other data processing logic to extract the intention of the autonomous vehicle 10 from the operational data.

The vehicle intention system 150 can output one or more intention signals that indicate the determined intention of the autonomous vehicle 10. For example, the vehicle intention system 150 can publish intention messages that indicate the determined intention to one or more components or systems that consume the intention messages. For example, the vehicle intention system 150 can output intention signals to the one or more sensors 101, the autonomy computing system 102, the one or more vehicle controls 107, the human machine interface system 130, the reflex control system 132, the one or more additional vehicle control systems 134, the remote vehicle control or supervision system 170, and/or the one or more additional autonomous vehicles 175.

Thus, the vehicle intention system 150 can receive input from multiple sources (e.g., various producers of operational data which is indicative of vehicle intentions) and send output (e.g., vehicle intention messages) to various components (e.g., consumers of vehicle intentions), thereby serving as a single definitive source of vehicle intention information. In particular, in some implementations, the vehicle intention system 150 serves as a layer to decouple the raw operational information indicative of the vehicle intentions and perform the process required to identify and extract the vehicle intentions from the raw operational data.

The vehicle intention system 150 can provide a clean and well-defined interface between the producers of the operational data indicative of vehicle intentions and the consumers of vehicle intentions. For example, the interface can be provided in the form of subscription/publication messaging and/or an application programming interface (API).

More particularly, the vehicle intention system 150 can receive or otherwise obtain one or more operational messages from various systems or components of an autonomous vehicle that operate to control the autonomous vehicle 10. These various systems or components that produce operational messages can be referred to as "producers" or "generators" of intention. Example producers include the autonomy computing system 102 or subsystems thereof. Additional example producers of operational messages include other systems included in or associated with the autonomous vehicle 10 such as, for example, the reflex control system 132, the remote control system 170, and/or other systems that contribute to control or operation of the autonomous vehicle 10.

The operational messages received by the vehicle intention system 150 can include operational data regarding the control or operation of the autonomous vehicle 10. In some instances, the operational data will be indicative of an intention of the autonomous vehicle 10 but does not necessarily specify the intention itself. Stated differently, in some instances, the operational data may describe how operation or control of the vehicle is being performed to choose and/or achieve the intention, but does not specify the particular intention itself.

The challenge of synthesizing across multiple sources of operational information to extract a singular vehicle intention is made significantly more difficult when, as described above, multiple different control systems exist which have overlapping control responsibilities and priorities. One example additional control system is the reflex control system 132. The reflex control system 132 can interrupt control of the motion of the autonomous vehicle 10 by the autonomy computing system 102 when sensor data indicates an imminent collision. For example, the reflex control system 132 can be a lower complexity/lower latency system relative to the autonomy computing system 102.

As a solution to the above described challenge, the vehicle intention system 150 can determine an intention of the autonomous vehicle 10 based at least in part on the one or more operational messages. For example, the vehicle intention system 150 can implement various algorithmic approaches, rules-based systems, machine-learned models, or other data processing logic to extract the intention of the autonomous vehicle 10 from the operational data.

As one example, a rules-based system (e.g., implemented by the intention extractor 156) can apply hierarchical rules to discern between control operations of various control systems and determine which control system will actually control the vehicle's intention. As one example, controls performed by the reflex control system 132 can outrank controls performed by the autonomy computing system 102, such that conflicting operational messages from such systems can be resolved according to such hierarchy and the intention of the autonomous vehicle 10 can be derived from the operational messages of the reflex control system 132 in favor of the operational messages of the autonomy computing system 102.

As another example intention extraction technique, the vehicle intention system 150 (e.g., the intention extractor 156) can include a machine-learned intention model that receives the operational data as input and provides a vehicle intention as an output. For example, the machine-learned model can be a neural network (e.g., deep neural network), a decision tree-based model (e.g., random forest), or other form of machine-learned model. In one example, the machine-learned intention model can be trained in a supervised fashion on training data that includes sets of operational data (e.g., from multiple sources) labeled with a ground-truth intention.

Example intentions that can be determined by the vehicle intention system 150 for the autonomous vehicle 10 include: a yielding, stopping, or queueing for vehicle(s) ahead intention; a turning intention (e.g., make right turn); a continuing through traffic light intention; a stopping for traffic light or stop sign intention; a yielding, stopping, or queueing for bicycle intention; a yielding, stopping, or queueing for pedestrian intention; a lane change intention (e.g., change lane one lane to the right); a cancellation intention (e.g., cancelling a previous intention to change lanes); a nudge around intention.

As indicated by certain of the example intentions provided above, in some implementations, in addition to determining the base intention of the autonomous vehicle 10, the vehicle intention system 150 can further identify a particular object (e.g., pedestrian, bicycle, vehicle, traffic signal (e.g., light or sign), etc.) that is a cause of the intention of the autonomous vehicle 10. As one example, in some implementations, the machine-learned intention model described above can be configured to identify the object that is the cause of the intention of the autonomous vehicle 10.

As another example, in some implementations, the vehicle intention system 150 (e.g., the intention extractor 156) can identify the object that is the cause of the intention of the autonomous vehicle 10 through performance of an iterative drop out method. In particular, the vehicle intention system 150 can determine, based on one or more cost functions, a total cost associated with a surrounding environment of the autonomous vehicle 10 that includes a plurality of objects. For example, the cost functions can be those used by the motion planning system to generate a motion plan. The vehicle intention system 150 can iteratively remove a respective one of the plurality of objects to determine a respective reduction in the total cost as a result of removing such object from the surrounding environment. The object for which removal results in the largest reduction in the total cost can be selected as the particular object that is the cause of the intention of the autonomous vehicle 10. As one example, the total cost associated with the surrounding environment can be a sum of a cost field that describes a respective cost for autonomous vehicle travel through each location in the surrounding environment. For example, the cost field can be a three-dimensional curve and the sum of the cost field can equal the volume underneath the curve.

Furthermore, in some implementations, the vehicle intention system 150 (e.g., the intention extractor 156) can further determine context information associated with the intention of the autonomous vehicle 10. As examples, such contextual information can include a class (e.g., type) of closest object for which the autonomous vehicle 10 is planning to yield, stop, or queue; a distance to the closest object for which the autonomous vehicle 10 is planning to yield, stop, or queue; a distance to a traffic light or stop sign at which the autonomous vehicle 10 is planning to stop; or other contextual information.

The vehicle intention system 150 can output one or more intention signals that indicate the determined intention of the autonomous vehicle 10. For example, the vehicle intention system 150 can publish intention messages that indicate the determined intention to one or more components or systems that consume the intention messages.

As examples, the consumers of the intention messages can be components or systems that control the operation of the autonomous vehicle 10; components or systems that interact with human passengers of the autonomous vehicle 10 (e.g., the human machine interface system 130); a remote computing system (e.g., the remote control or supervision system 170); and/or additional autonomous vehicles 175 (e.g., located near the autonomous vehicle 10). The consumers of the intention messages can leverage knowledge of the intention of the autonomous vehicle 10 to improve their respective operations.

In particular, vehicle intentions can play a major role in interaction with other actors (e.g., additional autonomous vehicles), other systems or components of the autonomous vehicle 10, passengers in the vehicle, and/or other consumers of intention information. As one example, the various subsystems of the autonomy computing system described above (e.g., a perception system, a prediction system, a motion planning system, or other subsystems) can significantly benefit from knowledge of the vehicle's intentions when the vehicle is operating in an autonomous mode.

For example, in response to an intention signal that identifies a particular object that is the cause of the intention of the autonomous vehicle 10, the autonomy computing system 102 can adjust its operations to allocate additional processing resources to the particular object. For example, one or more subsystems of the autonomy computing system 102 (e.g., perception and prediction systems) can prioritize processing of data associated with the particular object (e.g., by processing such data in an accelerated or advanced manner or by processing such data using systems/algorithms having relatively higher power and/or reduced latency).

As another example intention consumer, passengers in the vehicle can benefit from understanding the autonomous vehicle's intention. As such, one example system that can consume the intention signal or message is a human machine interface system 130 that is included within the autonomous vehicle 10. The human machine interface system 130 can enable communication, control, and/or other interface actions to occur between the autonomous vehicle 10 and a human (e.g., a passenger or supervisory "driver" located within the autonomous vehicle 10). The human machine interface system 130 can include or be implemented by one or more computing devices that are operatively connected. The human machine interface system 130 can be an embedded computing device or a stand-alone computing device. In one particular example, the human machine interface system 130 can be a tablet computing device that is positioned within the autonomous vehicle 10 (e.g., within a front seat area or a rear seat area of the autonomous vehicle 10).

The human machine interface system 130 can include one or more processors and a memory. The one or more processors can be any suitable processing device (e.g., a processor core, a microprocessor, an ASIC, a FPGA, a controller, a microcontroller, etc.) and can be one processor or a plurality of processors that are operatively connected. The memory can include one or more non-transitory computer-readable storage media, such as RAM, ROM, EEPROM, EPROM, one or more memory devices, flash memory devices, etc., and combinations thereof.

In some implementations, the human machine interface system 130 can include a display device (e.g., a touch-sensitive display device) and/or other input/output components that provide an interactive user interface (e.g., through which the passenger can interact with the autonomous vehicle 10).

The human machine interface system 130 can indicate the intention of the autonomous vehicle 10 to one or more humans physically located within the autonomous vehicle 10 (e.g., via icons on a graphical user interface). As a result of the conveyed intention, the passenger can have a more comfortable ride and be more confident in the competency of the vehicle. For example, a passenger that has knowledge of the autonomous vehicle's intention to stop at a stop sign can better prepare for the corresponding changes in force, thereby enhancing passenger comfort. Likewise, if the autonomous vehicle's intention to stop for a pedestrian is conveyed to the passenger of the vehicle 10, the passenger can feel more comfortable and confident that the autonomous vehicle 10 is understanding the surrounding environment and operating in a proper and safe manner.

As yet another example consumer, additional autonomous vehicles 175 located near the autonomous vehicle 10 can benefit from understanding the vehicle's intentions. For example, additional autonomous vehicles 175 that have been informed of the autonomous vehicle 10's intention to perform a lane change can adjust their spacing accordingly to enable the autonomous vehicle 10 to perform the lane change. As another example consumer, the autonomous vehicle 10 can signal its intention to humans located external to the autonomous vehicle 10.

As another example consumer, a remote control or supervision system 170 can consume the intention signals. For example, the intention of the autonomous vehicle 10 can be displayed to a remote controller or a remote supervisor, which can, for example, be a human operator. In other examples, the remote control system 170 can be associated with a central operations system and/or an entity associated with the autonomous vehicle 10 such as, for example, a vehicle owner, vehicle manager, fleet operator, service provider, etc.

As yet another example, in some implementations, the intention signals output by the vehicle intention system 150 over time can be logged or otherwise stored. These logged intention signals can be used for various purposes. As one example, the intention signals can be used as training data to train one or more machine-learned models. For example, the intention signals can be used to train a machine-learned intention model. As another example, the intention signals can be reviewed by a testing and development team when triaging vehicle failures or otherwise assessing and/or correcting/improving the performance of the autonomous vehicle 10 after-the-fact.

In some implementations, the vehicle intention system 150 can operate according to a publication/subscription model. For example, each of the one or more consumers can subscribe to a respective subset of particular intentions. The vehicle intention system 150 can output a particular intention signal to only those consumers that have subscribed to the particular intention indicated by the intention signal. In such fashion, consumers can receive only those intention signals that indicate intentions to which they have subscribed and find useful. The consumers can adjust their subscriptions over time.

In addition, in some implementations, the following flow of operations can be performed to configure the vehicle intention system 150. The vehicle intention system 150 can subscribe to various producer channels (e.g., motion planning system channels). This can be completely behind the scenes and abstracted away from the consumers. The consumer can then register its intention callbacks through the interface provided by the vehicle intention system API. At this point everything is set for the consumer to receive the intentions. Upon receiving the relevant messages from the producers, the vehicle intention system 150 dispatches the corresponding intention callbacks registered by the consumer.

In some implementations, the vehicle intention system 150 is a component within the autonomy computing system 102 which runs independent of the rest of the autonomy computing system 102. In other implementations, the vehicle intention system 150 can be a standalone system or otherwise not included within the autonomy computing system 102.

In some implementations, the vehicle intention system 150 can communicate the vehicle intention with its consumers using a vehicle intention message structure. There can be a base vehicle intention message class structure which can be sub-classed to generate consumer-specific vehicle intention message structures.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

The intention extractor 156 can include computer logic utilized to provide desired functionality. In some implementations, the intention extractor 156 can be implemented in hardware, firmware, and/or software controlling a general purpose processor. For example, in some implementations, the intention extractor 156 includes program files stored on a storage device, loaded into a memory and executed by one or more processors. In other implementations, the intention extractor 156 includes one or more sets of computer-executable instructions that are stored in a tangible computer-readable storage medium such as RAM hard disk or optical or magnetic media.

Figure 2A:
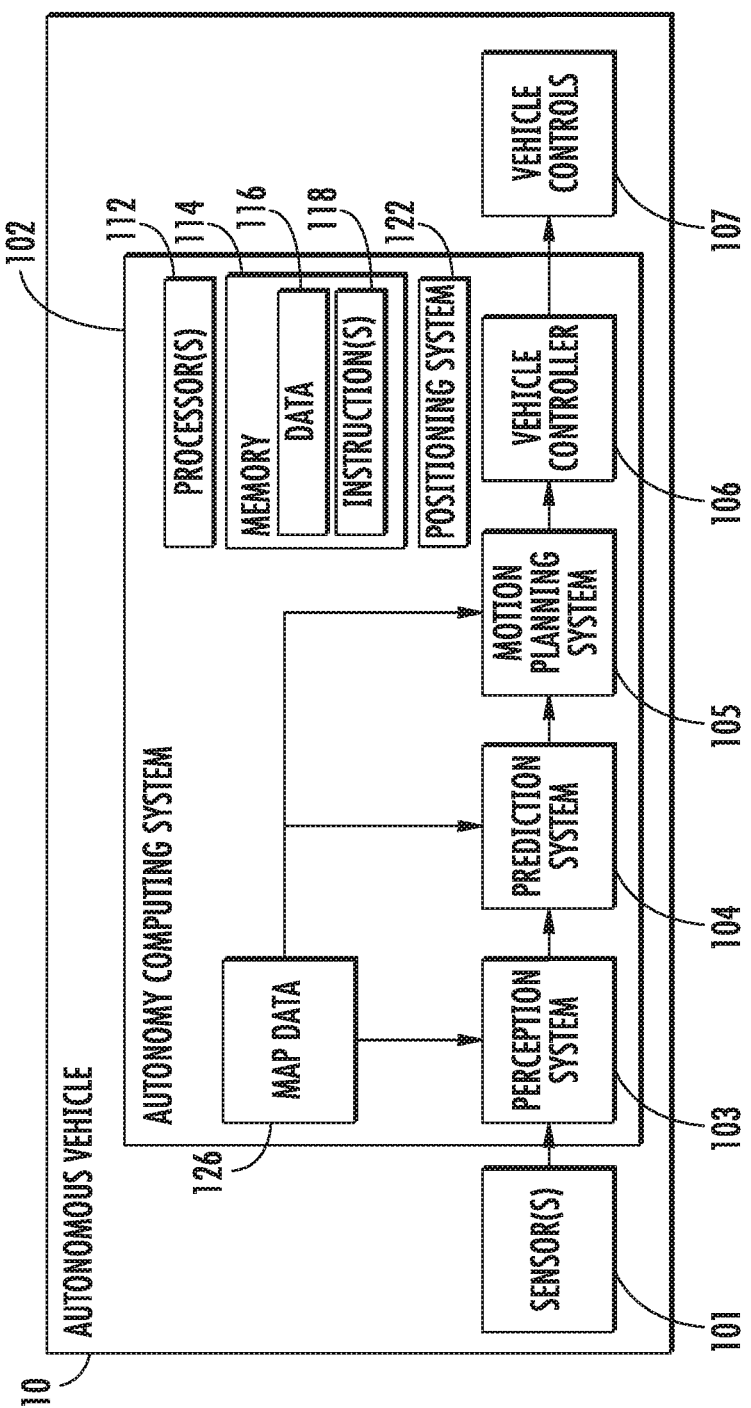
FIG. 2A depicts a block diagram of an example autonomy computing system according to example embodiments of the present disclosure.

FIG. 2A depicts a block diagram of an example autonomy computing system 102 of the autonomous vehicle 10 according to example embodiments of the present disclosure. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause vehicle computing system 102 to perform operations.

As illustrated in FIG. 2A, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly. Each of these systems can produce operational messages.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system 122. The positioning system 122 can determine a current position of the vehicle 10. The positioning system 122 can be any device or circuitry for analyzing the position of the vehicle 10. For example, the positioning system 122 can determine position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of objects and/or predicted future locations of proximate objects, the motion planning system 105 can determine a motion plan for the autonomous vehicle 10 that best navigates the autonomous vehicle 10 relative to the objects at such locations.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment. The motion planning system 105 can determine the plurality of features for each vehicle state included in the current candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan to a vehicle controller 106 that controls one or more vehicle controls 107 (e.g., actuators or other devices that control gas flow (propulsion), steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2B:
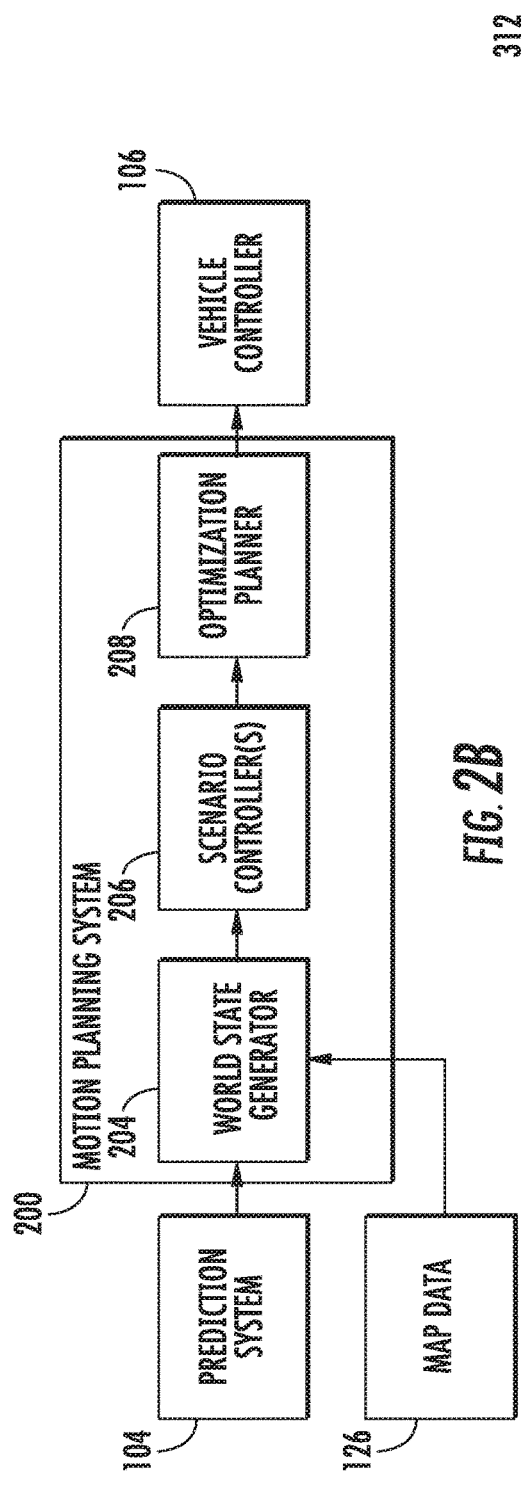
FIG. 2B depicts a block diagram of an example motion planning system according to example embodiments of the present disclosure.

FIG. 2B depicts a block diagram of an example motion planning system 200 according to example embodiments of the present disclosure. The example motion planning system 200 includes a world state generator 204, one or more scenario controllers 206, and an optimization planner 208. Each of these can produce operational messages.

The world state generator 204 can receive information from the prediction system 104, the map data 126, and/or other information such as vehicle pose, a current route, or other information. The world state generator 204 can synthesize all received information to produce a world state that describes the state of all objects in and other aspects of the surrounding environment of the autonomous vehicle at each time step.

The scenario controller(s) 206 can detect certain scenarios (e.g., a changing lanes scenario versus a queueing scenario) and guide the behavior of the autonomous vehicle according to the selected scenario. Thus, the scenario controller(s) can make discrete-type decisions (e.g., should the autonomous vehicle turn left, turn right, change lanes, etc.) and can control motion of the vehicle based on such decisions. In some implementations, each of the scenario controller(s) 206 can be a classifier (e.g., a machine-learned classifier) designed to classify the current state of the world as either included or excluded from one or more corresponding scenarios. In some implementations, the scenario controller(s) 206 can operate at each time step.

As examples, the scenario controllers 206 can include one or more of: a pass, ignore, queue controller that decides, for each object in the world, whether the autonomous vehicle should pass, ignore, or queue such object; a yield controller that decides, for each adjacent vehicle in the world, whether the autonomous vehicle should yield to such vehicle; a lane change controller that identifies whether and when to change lanes; and/or a speed regressor that determines an appropriate driving speed for each time step. These scenario controllers 206 are provided as examples only. Alternative and/or additional scenario controllers 206 can be used. In some implementations of the present disclosure, the motion planning system 200 does not include or implement the scenario controllers 206.

According to another aspect of the present disclosure, the motion planning system 200 can include an optimization planner 208 that searches (e.g., iteratively searches) over a motion planning space (e.g., an available control space) to identify a motion plan that optimizes (e.g., locally optimizes) a total cost associated with the motion plan. For example, the optimization planner can iteratively evaluate and modify a candidate motion plan until the total cost is optimized. As one example, the optimization planner 208 can be an iterative linear quadratic regulator.

Once the optimization planner 208 has identified the optimal candidate motion plan (or some other iterative break occurs), the optimal candidate motion plan can be selected and executed by the autonomous vehicle. For example, the motion planning system 200 can provide the selected motion plan to a vehicle controller 106 that controls one or more vehicle controls (e.g., actuators that control gas flow, steering, braking, etc.) to execute the selected motion plan.

Each of the world state generator 204, scenario controller(s) 206, and/or the optimization planner 208 can include computer logic utilized to provide desired functionality. In some implementations, each of world state generator 204, scenario controller(s) 206, and/or the optimization planner 208 can be implemented in hardware, firmware, and/or software controlling a general purpose processor. For example, in some implementations, each of world state generator 204, scenario controller(s) 206, and/or the optimization planner 208 includes program files stored on a storage device, loaded into a memory and executed by one or more processors. In other implementations, each of world state generator 204, scenario controller(s) 206, and/or the optimization planner 208 includes one or more sets of computer-executable instructions that are stored in a tangible computer-readable storage medium such as RAM hard disk or optical or magnetic media.

Figure 3:
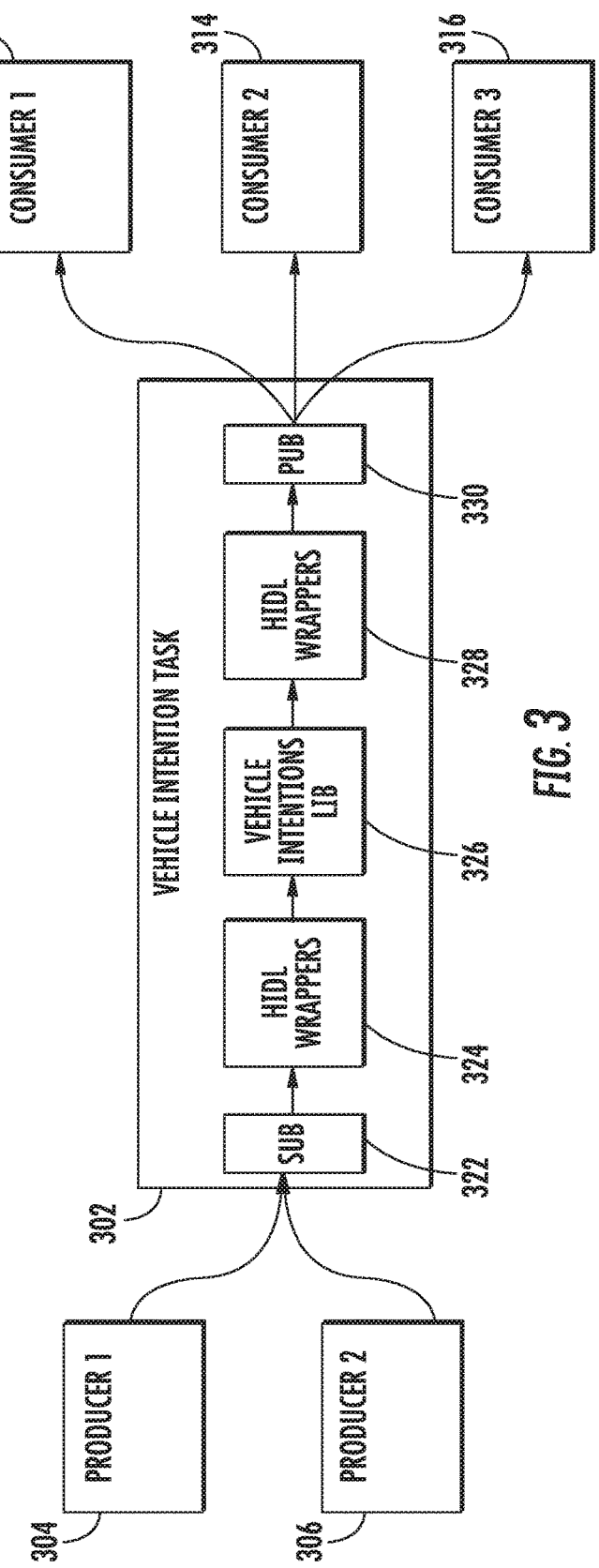
FIG. 3 depicts a block diagram of an example vehicle intention system according to example embodiments of the present disclosure.

FIG. 3 depicts a block diagram of an example vehicle intention system according to example embodiments of the present disclosure. In particular, FIG. 3 illustrates an example design in which the vehicle intention system is implemented as a computing task 302. In the example design illustrated in FIG. 3, the vehicle intention system can be implemented as a standalone computing task 302 which runs in parallel and interacts with the other computing tasks through task channels and messages. The core of vehicle intention system (e.g., callbacks and algorithms) can be encapsulated as a library 326 (e.g., a vehicle intention library) and can be instantiated as an object within the task.

More particularly, as illustrated in FIG. 3, a plurality of producers, such as example producers 304 and 306 can produce operational messages that are received by the vehicle intention task 302 due to a subscription (e.g., as illustrated as 322). In some implementations, the operational messages can be HIDL messages and the vehicle intention task can remove the HIDL wrapper at 324. The vehicle intentions library 326 can determine an intention based on the operational data included in the operational messages and can produce a vehicle intention message that indicates such determined intention. The vehicle intention message can be formatted as an HIDL message by adding HIDL wrapper(s) at 328. The vehicle intention message can then be published (e.g., via an output channel as shown at 330) to consumers who have subscribed to the intention indicated by the message. For example, this callback information can be stored within the library 326. As examples, the vehicle intention message can be published to consumers 312, 314, and 316. One benefit of this design is that it provides the same interface to all consumers and reduces the challenge of different consumers of data with different interface needs.

Figure 4:
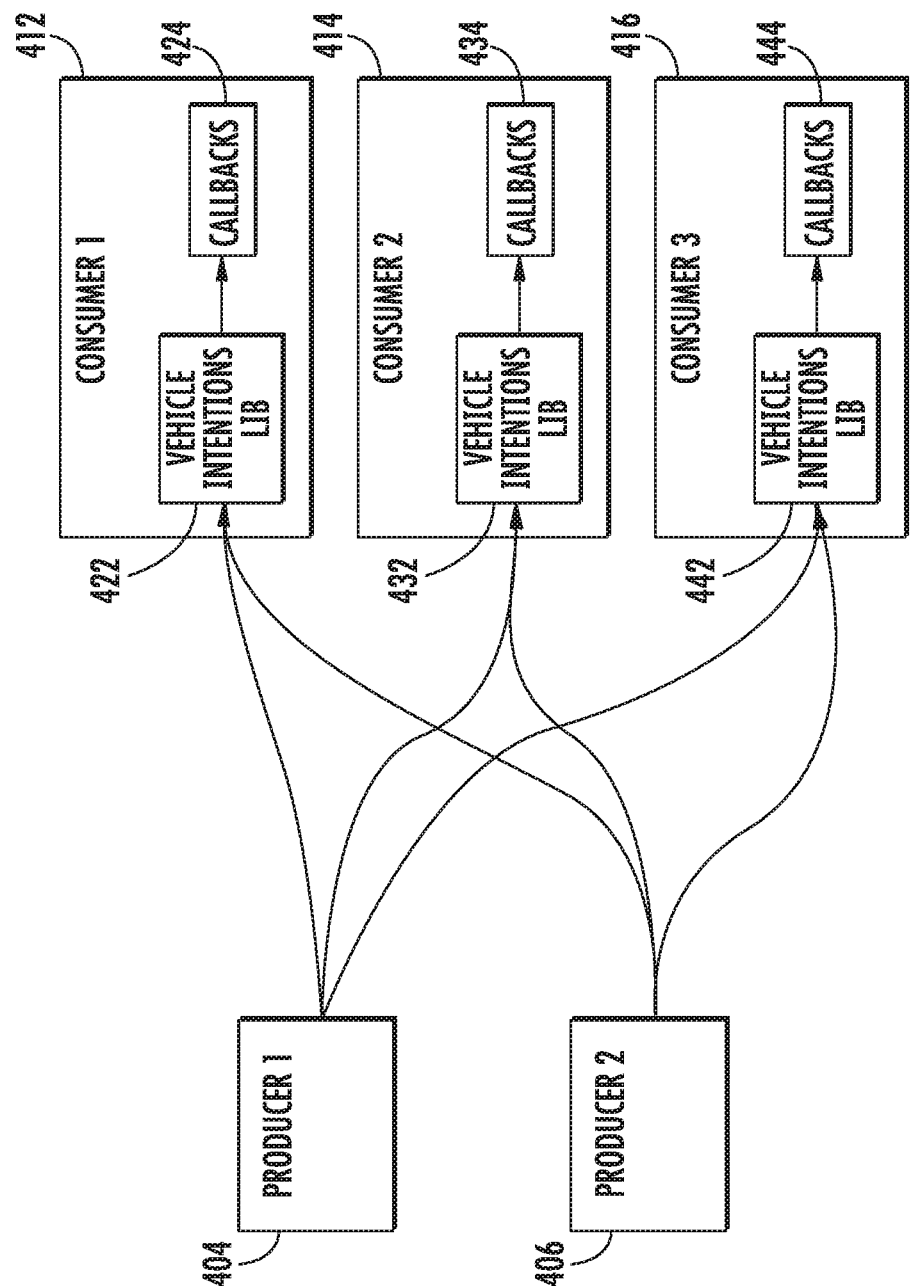
FIG. 4 depicts a block diagram of an example vehicle intention system according to example embodiments of the present disclosure.

FIG. 4 depicts a block diagram of an example vehicle intention system according to example embodiments of the present disclosure. In particular, FIG. 4 illustrates an example design in which the vehicle intention system is implemented as a computing library. In the example design illustrated in FIG. 4, the vehicle intention system can be implemented as a standalone library which provides an API for consumers to register their (intention) callbacks and a mechanism to dispatch the consumers' callbacks on availability of intentions. In some implementations of this design each consumer can be required to instantiate a copy of the library for its own use.

Thus, as an example, as illustrated in FIG. 4, each consumer 412, 414, and 416 instantiates its own copy of the vehicle intentions library for its own use. In particular, consumer 412 instantiates library 422; consumer 414 instantiates library 432; and consumer 416 instantiates library 442. Each library 422, 432, and 442 receives operational messages from one or more producers (e.g., as illustrated at 404 and 406) and provides corresponding consumer-specific intention messages based or respective callback information. In particular, library 422 provides vehicle intention messages according to callbacks 424 that are specific to the consumer 412; library 432 provides vehicle intention messages according to callbacks 434 that are specific to the consumer 414; and library 442 provides vehicle intention messages according to callbacks 444 that are specific to the consumer 416. Thus, each library can provide a mechanism for its respective consumer to register their specific callbacks.

Example Methods

Figure 5:
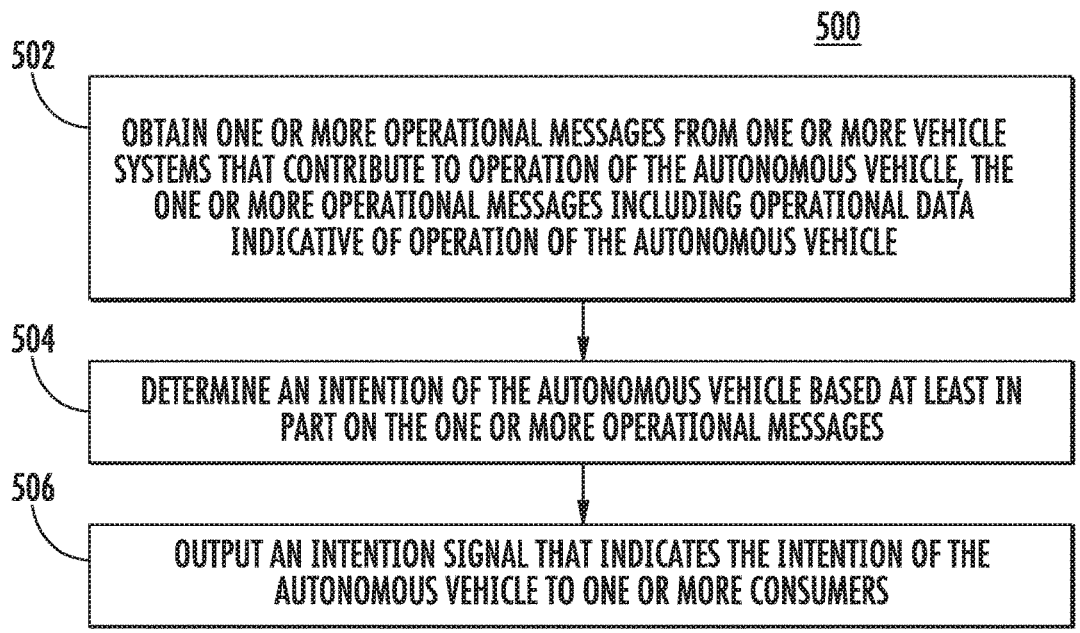
FIG. 5 depicts a flow chart diagram of an example method to indicate autonomous vehicle intention according to example embodiments of the present disclosure.

FIG. 5 depicts a flow chart diagram of an example method 500 to indicate autonomous vehicle intention according to example embodiments of the present disclosure.

At 502, a computing system obtains one or more operational messages from one or more vehicle systems that contribute to operation of the autonomous vehicle. The one or more operational messages include operational data indicative of operation of the autonomous vehicle.

At 504, the computing system determines an intention of the autonomous vehicle based at least in part on the one or more operational messages. As one example, determining the intention of the vehicle at 504 can include applying a set of rules to the operational data to determine the intention of the autonomous vehicle. As other examples, various algorithms or other data processing approaches can be used.

As another example, in some implementations, the computing system can further include an autonomy computing system that controls motion of the autonomous vehicle based at least in part on sensor data and a reflex control system that interrupts control of the motion of the autonomous vehicle by the autonomy computing system when the raw sensor data indicates an imminent collision. In such implementations, determining the intention at 504 can include determining the intention of the autonomous vehicle by synthesizing the one or more operational messages received from both the autonomy computing system and the reflex control system (e.g., according to a hierarchy).

As another example, determining the intention of the vehicle at 504 can include inputting the operational data included in the one or more operational messages into a machine-learned intention model and receiving the intention of the autonomous vehicle as an output of the machine-learned intention model.

Figure 6:
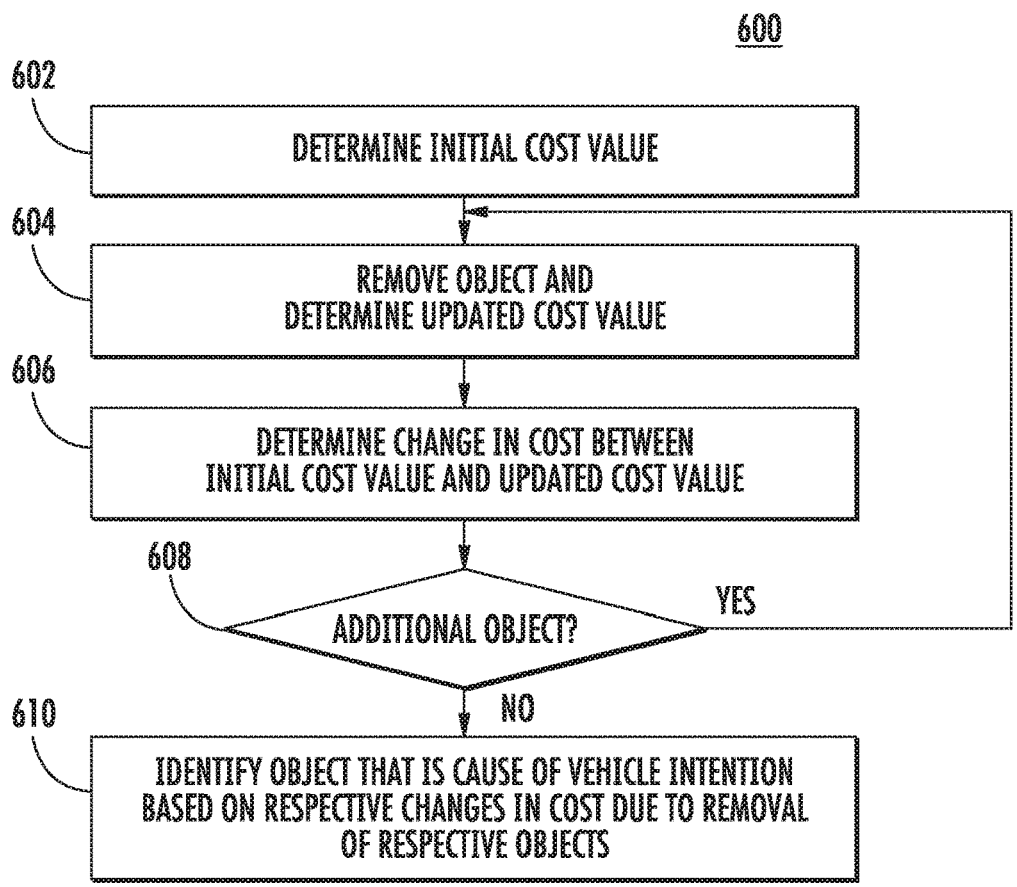
FIG. 6 depicts a flow chart diagram of an example method to identify an object that is a cause of an intention of an autonomous vehicle according to example embodiments of the present disclosure.

As another example, determining the intention of the vehicle at 504 can include identifying a particular object that is a cause of the intention of the autonomous vehicle. In one example, identifying the particular object that is the cause of the intention of the autonomous vehicle can include inputting the operational data included in the one or more operational messages into a machine-learned intention model and receiving identification of the particular object that is the cause of the intention of the autonomous vehicle as an output of the machine-learned intention model. As another example, an iterative drop out technique can be used, for example, as is illustrated in FIG. 6.

At 506, the computing system outputs an intention signal that indicates the intention of the autonomous vehicle to one or more consumers. For example, outputting the intention signal can include publishing an intention message.

As one example, the intention signal can identify a particular object as the cause of the intention of the autonomous vehicle.

As another example, the one or more consumers can include one or more subsystems of the autonomy computing system. For example, the one or more subsystems of the autonomy computing system that consume the intention signal can include one or more of: a perception system, a prediction system, and a motion planning system.

Furthermore, in some implementations, in response to an intention signal that identifies a particular object that is the cause of the vehicle intention, the autonomy computing system can adjust its operations to allocate additional processing resources to the particular object that is the cause of the intention of the autonomous vehicle.

As another example, the one or more consumers can include a human machine interface system that is included within the autonomous vehicle and that indicates the intention of the autonomous vehicle to one or more humans physically located within the autonomous vehicle.

As yet another example, the one or more consumers can include one or more additional autonomous vehicles.

In some implementations, each of the one or more consumers has subscribed to a respective subset of particular intentions. In such implementations, outputting the intention signal at 506 can include outputting the intention signal to only those consumers that have subscribed to the particular intention indicated by the intention signal.

In some implementations, the method 500 can further include logging the intention signals output by the vehicle intention system over time. For example, the logged intention signals can be used as training data to train one or more machine-learned models.

FIG. 6 depicts a flow chart diagram of an example method 600 to identify an object that is a cause of an intention of an autonomous vehicle according to example embodiments of the present disclosure.

At 602, a computing system determines an initial cost value. For example, the initial cost value can be a total cost associated with a planned trajectory or a total cost associated with a cost field. For example, the cost field can provide a cost for each location in the surrounding environment of the autonomous vehicle. As one example, the cost field can be a three-dimensional curve and the initial cost can be the volume underneath the curve.

At 604, the computing system removes an object and determines an updated cost value. More particularly, one object can be removed at each instance of 604. The cost value can be re-determined after removal of the object. For example, the cost field can be recomputed and the cost value can be updated.

At 606, the computing system determines a change in cost between the initial cost value and the updated cost value.

At 608, the computing system determines whether an additional object should be tested. For example, a certain number of objects can be tested. For example, a certain number of the closest objects and/or fastest moving objects can be tested.

If it is determined at 608 that an additional object should be tested, then method 600 returns to 604 and removes a different object and determines an updated cost value for that object. In such fashion, each object can be tested to determine its respective impact on the cost value.

To be clear, the objects that are removed at a particular iteration are "returned" prior to the next iteration of 604. That is, if object A is removed from the scene at a first iteration, and object B is removed from the scene at a second iteration, then at the second iteration object A is present within the scene.

Referring again to 608, if it is determined at 608 that an additional object should not be tested, then method 600 can identify the object that is the cause of the vehicle intention based on the respective changes in cost due to removal of respective objects. For example, the object for which removal resulted in the largest change in cost can be identified as the cause of the vehicle intention.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5 and 6 respectively depict steps performed in a particular order for purposes of illustration and discussion, the methods of the present disclosure are not limited to the particularly illustrated order or arrangement. The various steps of the methods 500 and 600 can be omitted, rearranged, combined, and/or adapted in various ways without deviating from the scope of the present disclosure.

What is claimed is:

1. A computing system of an autonomous vehicle, the computing system comprising:
   multiple different systems or subsystems that contribute to operation of the autonomous vehicle, wherein the multiple different systems or subsystems generate one or more operational messages that comprise operational data indicative of operation of the autonomous vehicle; and
   a vehicle intention system that is separate from and operates independently of the multiple different systems or subsystems, the vehicle intention system comprising:
     one or more non-transitory computer-readable media that store instructions that, when executed by one or more processors, cause the one or more processors to perform operations, the operations comprising:
       obtaining the one or more operational messages from the multiple different systems or subsystems that contribute to operation of the autonomous vehicle, the one or more operational messages comprising the operational data indicative of operation of the autonomous vehicle;
       determining an intention of the autonomous vehicle based at least in part on the one or more operational messages, wherein determining the intention of the autonomous vehicle based at least in part on the one or more operational messages comprises identifying a particular object that is a cause of the intention of the autonomous vehicle, and wherein identifying the particular object that is a cause of the intention of the autonomous vehicle comprises:
         determining, based on one or more cost functions, a total cost associated with a surrounding environment of the autonomous vehicle, the surrounding environment including a plurality of objects;
         iteratively removing a respective one of the plurality of objects to determine a respective reduction in the total cost as a result of removing such object from the surrounding environment; and
         identifying the object for which removal results in the largest reduction in the total cost as the particular object that is the cause of the intention of the autonomous vehicle; and
       outputting an intention signal that indicates the intention of the autonomous vehicle to one or more consumers, wherein outputting the intention signal comprises outputting the intention signal that identifies the particular object as the cause of the intention of the autonomous vehicle.

2. The computing system of claim 1, wherein the multiple different systems or subsystems that contribute to operation of the autonomous vehicle comprise an autonomy computing system that controls motion of the autonomous vehicle based at least in part on sensor data, and wherein the one or more consumers comprise one or more of the multiple different systems or subsystems that are included in the autonomy computing system.

3. The computing system of claim 2, wherein the one or more of the multiple different systems or subsystems that are included in the autonomy computing system that consume the intention signal comprise one or more of: a perception system, a prediction system, and a motion planning system.

4. The computing system of claim 1, wherein the one or more consumers comprise a human machine interface system that is included within the autonomous vehicle and that indicates the intention of the autonomous vehicle to one or more humans physically located within the autonomous vehicle.

5. The computing system of claim 1, wherein the one or more consumers comprise one or more additional autonomous vehicles.

6. The computing system of claim 1, wherein:
the multiple different systems or subsystems that contribute to operation of the autonomous vehicle comprise an autonomy computing system that controls motion of the autonomous vehicle by processing sensor data descriptive of the plurality of objects in the surrounding environment of the autonomous vehicle;
in response to the intention signal that identifies the particular object, the autonomy computing system adjusts its operations to allocate additional processing resources to the particular object that is the cause of the intention of the autonomous vehicle.

7. The computing system of claim 1, wherein the total cost associated with the surrounding environment comprises a sum of a cost field that describes a respective cost associated with each location in the surrounding environment.

8. The computing system of claim 1, wherein execution of the instructions by the one or more processors further cause the one or more processors to perform additional operations, the additional operations comprising:
logging the intention signals output by the vehicle intention system over time; and
using the logged intention signals as training data to train one or more machine-learned models.

9. The computing system of claim 1, wherein:
the multiple different systems or subsystems that contribute to operation of the autonomous vehicle comprise an autonomy computing system that controls motion of the autonomous vehicle by processing raw sensor data;
the multiple different systems or subsystems that contribute to operation of the autonomous vehicle comprise a reflex control system that interrupts control of the motion of the autonomous vehicle by the autonomy computing system when the raw sensor data indicates an imminent collision;
obtaining the one or more operational messages comprises obtaining the one or more operational messages from both the autonomy computing system and the reflex control system; and
determining the intention of the autonomous vehicle comprises determining the intention of the autonomous vehicle by synthesizing the one or more operational messages received from both the autonomy computing system and the reflex control system.

10. The computing system of claim 1, wherein:
the computing system further comprises a machine-learned intention model configured to receive the operational data and, in response, provide the intention of the autonomous vehicle; and
determining the intention of the autonomous vehicle comprises:
inputting the operational data included in the one or more operational messages into the machine-learned intention model; and
receiving the intention of the autonomous vehicle as an output of the machine-learned intention model.

11. The computing system of claim 1, wherein:
the computing system further comprises a machine-learned intention model configured to receive the operational data and, in response, identify a particular object that is a cause of the intention of the autonomous vehicle; and
determining the intention of the autonomous vehicle comprises:
inputting the operational data included in the one or more operational messages into the machine-learned intention model; and
receiving identification of the particular object that is the cause of the intention of the autonomous vehicle as an output of the machine-learned intention model.

12. The computing system of claim 1, wherein determining the intention of the autonomous vehicle comprises applying a set of rules to the operational data to determine the intention of the autonomous vehicle.

13. The computing system of claim 1, wherein:
each of the one or more consumers has subscribed to a respective subset of particular intentions; and
outputting the intention signal that indicates the intention of the autonomous vehicle to the one or more consumers comprises outputting the intention signal to only those consumers that have subscribed to the particular intention indicated by the intention signal.

14. An autonomous vehicle, comprising:
multiple different systems or subsystems that contribute to operation of the autonomous vehicle, wherein the multiple different systems or subsystems generate one or more operational messages that comprise operational data indicative of operation of the autonomous vehicle; and
a vehicle intention system that is separate from and operates independently of the multiple different systems or subsystems, the vehicle intention system comprising:
one or more non-transitory computer-readable media that store instructions that, when executed by one or more processors, cause the one or more processors to implement a vehicle intention system that performs operations, the operations comprising:
obtaining the one or more operational messages from one or more producers, the one or more operational messages comprising operational data indicative of operation of the autonomous vehicle;
determining an intention of the autonomous vehicle based at least in part on the one or more operational messages, wherein determining the intention of the autonomous vehicle based at least in part on the one or more operational messages comprises identifying a particular object that is a cause of the intention of the autonomous vehicle, and wherein identifying the particular object that is a cause of the intention of the autonomous vehicle comprises:
determining, based on one or more cost functions, a total cost associated with a surrounding environment of the autonomous vehicle, the surrounding environment including a plurality of objects;
iteratively removing a respective one of the plurality of objects to determine a respective reduction in the total cost as a result of removing such object from the surrounding environment; and
identifying the object for which removal results in the largest reduction in the total cost as the particular object that is the cause of the intention of the autonomous vehicle; and outputting an intention signal that indicates the intention of the autonomous vehicle to one or more consumers, wherein outputting the intention signal comprises outputting the intention signal that identifies the particular object as the cause of the intention of the autonomous vehicle.

15. The autonomous vehicle of claim 14, wherein the one or more consumers comprise one or more of:
an autonomy computing system that controls motion of the autonomous vehicle based at least in part on sensor data;
a human machine interface system that is included within the autonomous vehicle and that indicates the intention of the autonomous vehicle to one or more humans physically located within the autonomous vehicle; and
one or more additional autonomous vehicles.

16. The autonomous vehicle of claim 14, wherein:
the multiple different systems or subsystems that contribute to operation of the autonomous vehicle comprise an autonomy computing system that controls motion of the autonomous vehicle by processing sensor data descriptive of the plurality of objects in the surrounding environment of the autonomous vehicle;
in response to the intention signal that identifies the particular object, the autonomy computing system adjusts its operations to allocate additional processing resources to the particular object that is the cause of the intention of the autonomous vehicle.

17. A computing system of an autonomous vehicle, the computing system comprising:
one or more processors; and
one or more non-transitory computer-readable media that store instructions that, when executed by the one or more processors, cause the one or more processors to implement a vehicle intention system that performs operations, the operations comprising:
obtaining one or more operational messages from one or more vehicle systems that contribute to operation of the autonomous vehicle, the one or more operational messages comprising operational data indicative of operation of the autonomous vehicle;
determining an intention of the autonomous vehicle based at least in part on the one or more operational messages, wherein determining the intention of the autonomous vehicle based at least in part on the one or more operational messages comprises identifying a particular object that is a cause of the intention of the autonomous vehicle, wherein identifying the particular object that is the cause of the intention of the autonomous vehicle comprises:
determining, based on one or more cost functions, a total cost associated with a surrounding environment of the autonomous vehicle, the surrounding environment including a plurality of objects;
iteratively removing a respective one of the plurality of objects to determine a respective reduction in the total cost as a result of removing such object from the surrounding environment; and
identifying the object for which removal results in the largest reduction in the total cost as the particular object that is the cause of the intention of the autonomous vehicle; and
outputting an intention signal that indicates the intention of the autonomous vehicle to one or more consumers, wherein outputting the intention signal comprises outputting the intention signal that identifies the particular object as the cause of the intention of the autonomous vehicle.

* * * * *